US010784691B2

(12) United States Patent
Ito et al.

(10) Patent No.: US 10,784,691 B2
(45) Date of Patent: Sep. 22, 2020

(54) POWER SUPPLY SYSTEM AND METHOD OF CONTROLLING THE SAME

(71) Applicant: Panasonic Intellectual Property Management Co., Ltd., Osaka (JP)

(72) Inventors: Tomoki Ito, Hyogo (JP); Yasufumi Takahashi, Osaka (JP); Atsushi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 16/381,056

(22) Filed: Apr. 11, 2019

(65) Prior Publication Data

US 2019/0386491 A1 Dec. 19, 2019

(30) Foreign Application Priority Data

Jun. 13, 2018 (JP) .................................. 2018-113169

(51) Int. Cl.
*H02J 3/46* (2006.01)
*H01M 8/04858* (2016.01)
(Continued)

(52) U.S. Cl.
CPC ........... *H02J 3/46* (2013.01); *H01M 8/04925* (2013.01); *H01M 8/0606* (2013.01); *H02J 1/10* (2013.01);
(Continued)

(58) Field of Classification Search
CPC .......... H02J 2300/30; H02J 3/381; H02J 3/28; H02J 3/32; H02J 3/387; H02J 15/00;
(Continued)

(56) References Cited

U.S. PATENT DOCUMENTS

2003/0227276 A1 12/2003 Agbossou et al.
2009/0189445 A1 7/2009 Strizki

FOREIGN PATENT DOCUMENTS

JP  2015053151 A  *  3/2015
JP  2016208694 A  *  12/2016  ................ H02J 7/35
(Continued)

OTHER PUBLICATIONS

The Extended European Search Report dated May 27, 2019 for the related European Patent Application No. 19169764.8.

*Primary Examiner* — Ryan Johnson
(74) *Attorney, Agent, or Firm* — McDermott Will & Emery LLP (57) ABSTRACT

A power supply system includes: a hydrogen generation device that uses electric power to generate hydrogen; a hydrogen storage device that stores hydrogen generated by the hydrogen generation device; a fuel cell system that uses hydrogen stored in the hydrogen storage device to generate electric power; a power storage device; and a control device executing at least one of first control and second control based on an electricity expense, the first control controlling a first ratio between electric power to be supplied from a natural energy power generation device to the hydrogen generation device and electric power to be supplied from the natural energy power generation device to the power storage device, the second control controlling a second ratio between electric power to be supplied from the power storage device to a load and electric power to be supplied from the fuel cell system to the load.

8 Claims, 5 Drawing Sheets

(51) Int. Cl.
*H01M 8/0606* (2016.01)
*H02J 1/10* (2006.01)
*H02J 7/00* (2006.01)
*H02J 3/38* (2006.01)
*H02J 3/28* (2006.01)
*H02J 15/00* (2006.01)

(52) U.S. Cl.
CPC ............... *H02J 3/28* (2013.01); *H02J 3/381* (2013.01); *H02J 7/007* (2013.01); *H02J 15/00* (2013.01); *H02J 2300/30* (2020.01); *Y02E 10/563* (2013.01); *Y02E 60/50* (2013.01); *Y02E 70/10* (2013.01); *Y10T 307/50* (2015.04)

(58) Field of Classification Search
CPC .... H02J 2300/24; H02J 2310/64; H02J 3/383; H02J 7/007; H01M 16/006; H01M 8/04925; H01M 8/04992; Y02E 10/563; Y02E 60/50; Y02E 70/10; Y02E 70/30; Y10T 307/50
See application file for complete search history.

(56) References Cited

FOREIGN PATENT DOCUMENTS

WO          2017/013751          1/2017
WO       WO-2019159377 A1 *   8/2019   .......... H01M 8/0656

* cited by examiner

POWER SUPPLY SYSTEM AND METHOD OF CONTROLLING THE SAME

BACKGROUND

1. Technical Field

The present disclosure relates to a power supply system.

2. Description of the Related Art

To supply sufficient electric power to a load, a conventional power supply system determines the amounts of electric power to be supplied to a power storage device and a hydrogen generation device during the day and also determines the amounts of electric power to be supplied from the power storage device to the load and from a fuel cell to the load at night, based on a predicted value for the amount of electric power generated by a natural energy power generation device and a predicted value for the amount of electric power demanded by the load (see Japanese Patent No. 6189448, for example).

SUMMARY

When the conventional power supply system is operated while being interconnected to an electric power system, even if electric power cannot be supplied from the natural energy power generation device, power storage device, or fuel cell, the conventional power supply system can purchase electric power from the electric power system. This is advantageous in that the capacities and costs of devices can be reduced. When operation is performed with the power supply system interconnected to the electric power system, however, attention needs to be paid to electricity expenses depending on the unit electric power price at a time when electric power is received or caused to flow back. In spite of this, the conventional technology does not cover this issue. Therefore, the conventional technology is problematic in that electricity expenses may be increased when operation is performed with the power supply system interconnected to the electric power system.

One non-limiting and exemplary embodiment provides a power supply system that can supply electric power to a load in a manner that reduces electricity expenses.

In one general aspect, the techniques disclosed here feature a power connected to an electric power system, a natural energy power generation device, and a load. The power supply system includes: a hydrogen generation device that uses electric power to generate hydrogen; a hydrogen storage device that stores hydrogen generated by the hydrogen generation device; a fuel cell system that uses hydrogen stored in the hydrogen storage device to generate electric power; a power storage device; and a control device executing at least one of first control and second control based on an electricity expense, the first control controlling a first ratio between electric power to be supplied from the natural energy power generation device to the hydrogen generation device and electric power to be supplied from the natural energy power generation device to the power storage device, the second control controlling a second ratio between electric power to be supplied from the power storage device to the load and electric power to be supplied from the fuel cell system to the load.

The power supply system in the present disclosure can supply electric power to a load in a manner that reduces electricity expenses.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

After diligent study of the problem described above, the present inventors obtained findings described below.

The present disclosure is targeted at the power supply system in an energy network that includes a natural energy power generation device, a power supply system, and a load. The power supply system includes a control device and a storage system that stores electric power. The storage system has a hydrogen generation device that generates hydrogen by suing electric power and a hydrogen storage device that store hydrogen generated by the hydrogen generation device, and a fuel cell system that uses hydrogen stored in the hydrogen storage device to generate electric power.

In the description below, the combination of the hydrogen generation device, hydrogen storage device, and fuel cell system in this power supply system will be referred to as a hydrogen-type power storage device for convenience. The supply of electric power to the hydrogen generation device will be represented as "the hydrogen-type power storage device is charged" for convenience. The output of electric power from the fuel cell system will be represented as "the hydrogen-type power storage device is discharged" for convenience. Input electric power (electric power to be consumed) to the hydrogen generation device will be referred to as charge electric power to the hydrogen-type power storage device for convenience. Electric power generated by the fuel cell system will be referred to as discharge electric power from the hydrogen-type power storage device for convenience. Under the assumption that hydrogen stored in the hydrogen storage device is completely used to generate electric power in the fuel cell system, the total amount of generated electric power will be referred to as the amount of electric power stored in the hydrogen-type power storage device.

In a case in which this power supply system (energy network) is interconnected to an electric power system, when electric power is caused to flow back from the energy network to the electric power system, this will be referred to as electricity selling. Similarly, when electric power is received by the energy network, this will be referred to as electricity purchase.

In the present disclosure, surplus electric power in the natural energy power generation device means a difference between demanded electric power (power consumed by the load) and electric power generated by the natural energy power generation device. When surplus electric power is takes a positive value, this means that demanded electric power is less than electric power generated by the natural energy power generation device. When surplus electric power takes a negative value, this means that demanded electric power is more than electric power generated by the natural energy power generation device.

The capacity with which the storage system stores electric power is restricted by an amount by which the storage system can be charged or discharged per unit time (the electric power is rated electric power) and an amount (capacity) by which the storage system can store electric power.

In comparison between the power storage device and hydrogen-type power storage device that constitute the storage system, the power storage device can store or release more electric power per unit time and has a smaller capacity with which electric power can be stored than the hydrogen-type power storage device.

With energy efficiency taken into consideration, it is appropriate that the power storage device having higher energy efficiency than the hydrogen-type power storage device is preferentially charged or discharged.

If the power storage device is preferentially used when surplus electric power takes a positive value, however, the remaining amount of electric power stored in the power storage device will reach the upper limit at an early stage. Then, only the hydrogen-type power storage device, which can store only a small amount of electric power per unit time, can store surplus electric power (can store hydrogen), in which case surplus electric power that cannot be stored is sold. As a result, the amount of sold electric power is the amount of electric power that could not be stored in the storage system. When surplus electric power takes a negative value, the amount of sold electric power leads to the amount of purchased electric power.

If the power storage device is preferentially used when surplus electric power takes a negative value, the remaining amount of electric power stored in the power storage device will reach the lower limit at an early stage. Then, only the hydrogen-type power storage device, which can release only a small amount of electric power per unit time, can release surplus electric power, in which case electric power is purchased by an amount by which electric power is insufficient for demanded electric power.

That is, if the power storage device is preferentially charged or discharged regardless of whether surplus electric power takes a positive or negative value, electricity purchase is likely to occur. When the price of electricity to be purchased is higher than the price of electricity to be sold, if electricity purchase occurs, an electricity usage fee will become high.

As is clear from the above description, to prevent electricity purchase, it suffices to use both the power storage device and the hydrogen-type power storage device so that the remaining amount electric power stored in the power storage device does not reach the upper limit or lower limit at an early stage without preferentially using the power storage device.

A time at which the remaining amount of electric power stored in the power storage device reaches the upper limit or lower limit can be adjusted by adjusting the ratio between electric power by which the power storage device is charged and electric power by which the hydrogen-type power storage device is charged when surplus electric power takes a positive value or the ratio between electric power by which the power storage device is discharged and electric power by which the hydrogen-type power storage device is discharged when surplus electric power takes a negative value.

That is, the amount of electric power to be purchased and, by extension, the electricity expense can be adjusted by adjusting the ratio between electric power by which the power storage device is charged and electric power by which the hydrogen-type power storage device is charged when surplus electric power takes a positive value or the ratio between electric power by which the power storage device is discharged and electric power by which the hydrogen-type power storage device is discharged when surplus electric power takes a negative value.

In this present disclosure, an electricity expense is a payment to the power system carrier; an electricity expense may be the fee of purchased electricity itself or may be a difference between the fee of purchased electricity itself and the fee of sold electricity.

The present disclosure was made on the basis of the findings described above.

Contents of the Present Disclosure

A power supply system in a first aspect is a power supply system connected to an electric power system, a natural energy power generation device, and a load. The power supply system includes: a hydrogen generation device that uses electric power to generate hydrogen; a hydrogen storage device that stores hydrogen generated by the hydrogen generation device; a fuel cell system that uses hydrogen stored in the hydrogen storage device to generate electric power; a power storage device; and a control device executing at least one of first control and second control based on an electricity expense, the first control controlling a first ratio between electric power to be supplied from the natural energy power generation device to the hydrogen generation device and electric power to be supplied from the natural energy power generation device to the power storage device, the second control controlling a second ratio between electric power to be supplied from the power storage device to the load and electric power to be supplied from the fuel cell system to the load.

As described above, the electricity expense can be adjusted by adjusting ratios at which electric power is supplied to and released from the hydrogen-type power storage device having the power storage device, hydrogen generation device, hydrogen storage device, and fuel cell system. In this structure, based on an electricity expense, the control device executes at least one of the first control and the second control. Therefore, when the above ratio of electric power in the first control or second control is appropriately selected, it is possible to reduce electricity expenses charged on the demander having the load.

When surplus electric power in the natural energy power generation device is to be received, both the power storage device and the hydrogen-type power storage device are used. Therefore, in the reception of surplus electric power in the natural energy power generation device, the possibility that a loss in surplus electric power is caused by electricity selling can be lowered when compared with a case in which the power storage device preferentially is used.

In a power supply system in a second aspect, in the first aspect, the control device may control, in the first control, the first ratio so that the electricity expense is reduced.

In this structure, when the first ratio of electric power is appropriately selected, it is possible to supply electric power from the natural energy power generation device to the hydrogen generation device and power storage device so as to reduce electricity expenses charged on the demander having the load.

In a power supply system in a third aspect, in the first aspect, the control device may control, in the second control, the second ratio so that the electricity expense is reduced.

In this structure, when the second ratio of electric power is appropriately selected, it is possible to reduce electricity expenses charged on the demander having the load.

In a power supply system in a fourth aspect, in the first or second aspect, the control device may execute the first control in a time period during which surplus electric power in the natural energy power generation device is less than the total of electric power that can be stored in the power storage device and electric power that can be received by the hydrogen generation device.

In this structure, a time at which the remaining amount of electric power stored in the power storage device reaches the upper limit can be adjusted. As a result, it is possible to reduce electricity expenses charged on the demander having the load.

In a power supply system in a fifth aspect, in the fourth aspect, the control device may execute the first control before a time period during which surplus electric power in the natural energy power generation device peaks on the positive side to control the first ratio so that capacity by which the power storage device can be charged remains after the time period during which surplus electric power peaks.

In this structure, it is possible to reduce the occurrence of the problem that the remaining amount of electric power stored in the power storage device reaches the upper limit in a time period during which surplus electric power peaks on the positive side and only the hydrogen generation device thereby needs to be used for surplus electric power after the time period during which surplus electric power peaks. As a result, it is possible to reduce electricity expenses charged on the demander having the load.

In a power supply system in a sixth aspect, in the first or third aspect, the control device may execute the second control in a time period during which electric power demanded by the load is less than the total of electric power that can be released from the power storage device and electric power that can be generated by the fuel cell system.

In this structure, a time at which the remaining amount of electric power stored in the power storage device reaches the lower limit can be adjusted. As a result, it is possible to reduce electricity expenses charged on the demander having the load.

In a power supply system in a seventh aspect, in the first or third aspect, the control device may execute the second control before a time period during which surplus electric power in the natural energy power generation device peaks on the negative side to control the second ratio so that capacity by which the power storage device can be discharged remains after a time period during which electric power demanded by the load peaks.

In this structure, it is possible to reduce the occurrence of the problem that the remaining amount of electric power stored in the power storage device reaches the lower limit in a time period during which surplus electric power peaks on the negative side and only the hydrogen generation device thereby needs to be used for the demanded electric power after the time period during which surplus electric power peaks. As a result, it is possible to reduce electricity expenses charged on the demander having the load.

A method, in an eighth aspect, of controlling a power supply system is a method of controlling a power supply system connected to an electric power system, a natural energy power generation device, and a load. The method includes: generating hydrogen in a hydrogen generation device by using surplus electric power in the natural energy power generation device; storing generated hydrogen in a hydrogen storage device; generating electric power in a fuel cell system by using hydrogen stored in the hydrogen storage device; charging a power storage device by using surplus electric power in the natural energy power generation device; discharging the power storage device; and executing at least one of first control and second control based on an electricity expense, the first control controlling a first ratio between electric power to be supplied from the natural energy power generation device to the hydrogen generation device and electric power to be supplied from the natural energy power generation device to the power storage device, the second control controlling a second ratio between electric power to be supplied from the power storage device to the load and electric power to be supplied from the fuel cell system to the load.

In this structure, when the above ratio of electric power in first control or second control is appropriately selected, it is possible to reduce electricity expenses charged on the demander having the load.

When the first control or second control is executed, it is possible to reduce the possibility that electricity selling occurs when the amount of surplus electric power is more than the free capacity of the power storage device or electricity purchase occurs when demanded electric power is more than the remaining amount of electric power stored in the power storage device when compared with a case in which the power storage device is preferentially charged or discharged.

In a power supply system in a ninth aspect, in the first or second aspect, the control device may execute the first control in a time period during which surplus electric power in the natural energy power generation device is more than electric power that can be stored in the power storage device and is less than the total of electric power that can be stored in the power storage device and electric power that can be received by the hydrogen generation device so that electric power to be supplied to the power storage device becomes less than electric power that can be stored in the power storage device.

In this structure, the power storage device is charged so that the upper limit of electric power that can be stored in the power storage device is not exceeded. Therefore, a time at which the remaining amount of electric power stored in the power storage device reaches the upper limit can be delayed when compared with a case in which the power storage device is charged up to the upper limit of electric power that can be stored in the power storage device. As a result, it is possible to lower the possibility that electricity selling occurs.

In a power supply system in a tenth aspect, in the first or third aspect, the control device may execute the second control in a time period during which electric power demanded by the load is more than electric power that can be released from the power storage device and is less than the total of electric power that can be released from the power storage device and electric power that can be generated by the fuel cell system so that electric power to be supplied from the power storage device to the load becomes less than electric power that can be released from the power storage device.

In this structure, the power storage device is charged so that the upper limit of electric power that can be released from the power storage device is not exceeded. Therefore, a time at which the remaining amount of electric power stored in the power storage device reaches the lower limit can be delayed when compared with a case in which the power storage device is discharged up to the upper limit electric power that can be released from the power storage device. As a result, it is possible to lower the possibility that electricity purchase occurs.

In a power supply system in an eleventh aspect, in the fourth aspect, the power storage device may execute the first control before a time period during which surplus electric power in the natural energy power generation device peaks so that much more free capacity remains by which the power storage device can be charged remains after the time period during which surplus electric power peaks.

In this structure, it is possible to reduce the occurrence of the problem that the remaining amount of electric power stored in the power storage device reaches the upper limit at an early stage and only the hydrogen generation device thereby needs to be used for surplus electric power after a time period during which surplus electric power peaks on the positive side. As a result, it is possible to reduce electricity expenses charged on the demander having the load.

In a power supply system in a twelfth aspect, in the first or third aspect, the power storage device may execute the second control before a time period during which electric power demanded by the load peaks so that much more electric power remains in the power storage device after the electric power demanded by the load peaks.

In this structure, it is possible to reduce the occurrence of the problem that the remaining amount of electric power stored in the power storage device reaches the lower limit at an early stage after a time period during which surplus electric power peaks on the negative side and only the hydrogen generation device thereby needs to be used for surplus electric power after the time period during which surplus electric power peaks on the negative side. As a result, it is possible to reduce electricity expenses charged on the demander having the load.

Embodiments, in the present disclosure, that crystallize the present disclosure will be described below with reference to the drawings.

First Embodiment

Structure

Figure 1:
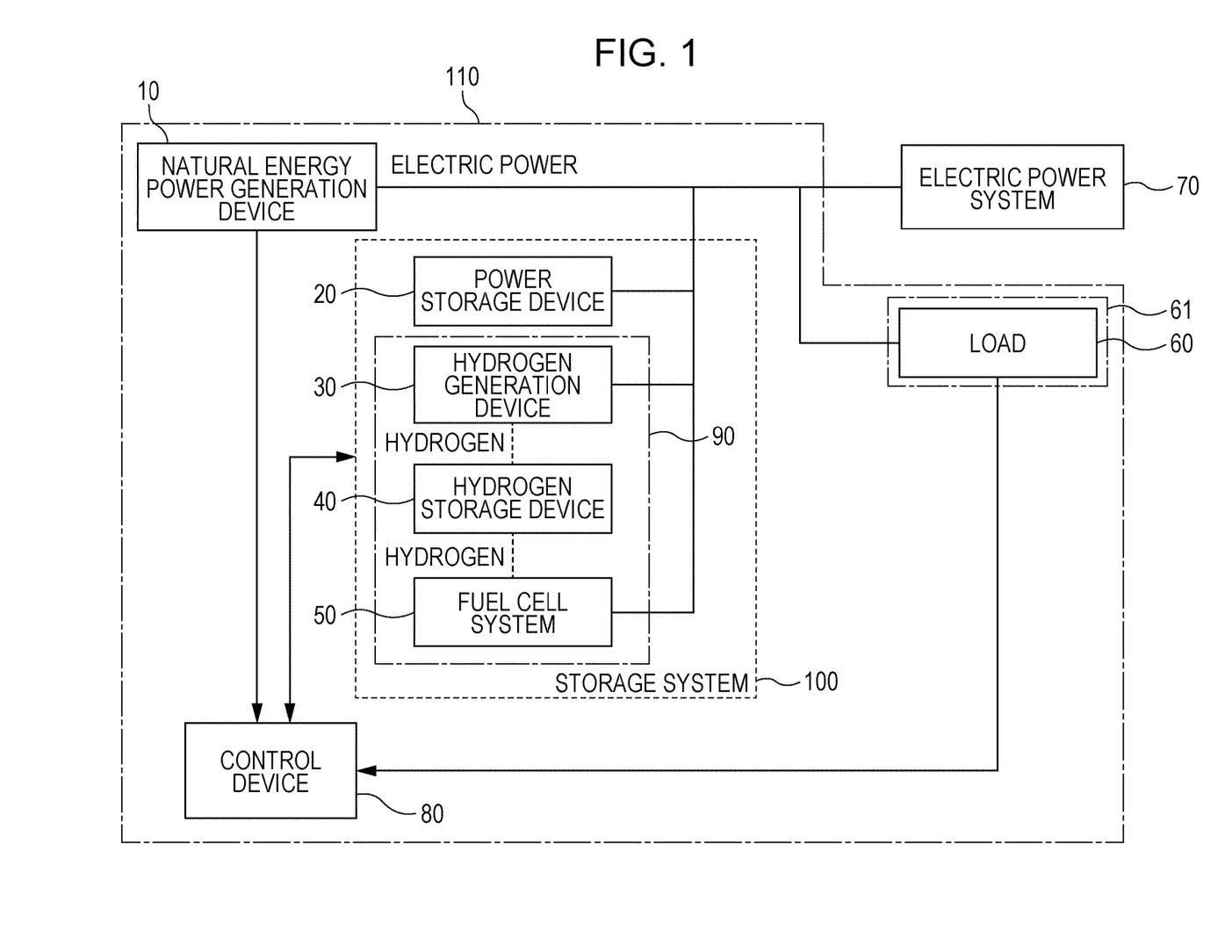
FIG. 1 illustrates an example of a power supply system according to a first embodiment of the present disclosure.

FIG. 1 illustrates an example of a power supply system according to a first embodiment of the present disclosure. As illustrated in FIG. 1, a natural energy power generation device 10, a storage system 100, a control device 80, and a load 60 constitute an energy network 110. The storage system 100 and control device 80 constitute the power supply system according to this embodiment. The owner of the load 60 is a power consumer 61 having the load 60.

The storage system 100 has a power storage device 20, a hydrogen generation device 30, a hydrogen storage device 40, and a fuel cell system 50. The hydrogen generation device 30, hydrogen storage device 40, and fuel cell system 50 constitute a hydrogen-type power storage device 90.

The energy network 110 is electrically connected to an electric power system 70. Specifically, the natural energy power generation device 10, power storage device 20, hydrogen generation device 30, and fuel cell system 50 are connected to the load 60 and electric power system 70 through power transmission paths.

The control device 80 receives information about electric power consumed by the load 60 (demanded electric power) from the load 60 and information about electric power generated by the natural energy power generation device 10 from the natural energy power generation device 10. The control device 80 also receives information about the amount of electric power stored in the storage system 100 from the storage system 100. Specifically, the control device 80 receives information about the amount of electric power stored in the power storage device 20 and the amount of hydrogen stored in the hydrogen storage device 40.

Based on these information items, the control device 80 controls the operations of the power storage device 20, hydrogen generation device 30, and fuel cell system 50. Specifically, the control device 80 controls electric power to be supplied from the natural energy power generation device 10 to the storage system 100 and electric power to be distributed from the storage system 100 to the load 60.

Although there is no particular limitation on targets to which this energy network 110 is applied, they are exemplified by isolated islands, factories, commercial facilities, houses, and the like. If the energy network 110 is applied to a house, the owner of the house is the power consumer 61 having the load 60 and is also the owner of the energy network 110.

These elements will be described below in detail.

Natural Energy Power Generation Device

The natural energy power generation device 10 uses natural energy to generate electric power. In this embodiment, the natural energy power generation device 10 is a solar power generation device that uses sunlight to generate electric power. The natural energy power generation device 10 may be, for example, a wind power generation device or a hydroelectric power generation device.

Storage System

The storage system 100, which is connected to the natural energy power generation device 10, electric power system 70 and load 60, stores electric power generated by the natural energy power generation device 10 or electric power (electric energy) received from the electric power system 70, and supplies electric power to the load 60. In this case, the storage system 100 is controlled by the control device 80 for electric power to be supplied to the storage system 100 and electric power to be distributed from the storage system 100.

Power Storage Device

The power storage device 20 stores electric power generated by the natural energy power generation device 10 or electric power (electric energy) received from the electric power system 70 under control of the control device 80. Stored electric power is released to the load 60 or electric power system 70 under control of the control device 80. The power storage device 20 sends a state of charge (SOC), which indicates the remaining amount of electric power (the amount of charge) stored in the power storage device 20 to the control device 80. The power storage device 20 is, for example, a secondary battery or a capacitor.

Hydrogen Generation Device

The hydrogen generation device 30 uses electric power generated by the natural energy power generation device 10 or electric power received from the electric power system 70 to generate hydrogen under control of the control device 80. The hydrogen generation device 30 is, for example, a device that performs electrolysis of water.

Hydrogen Storage Device

The hydrogen storage device 40 stores hydrogen generated by the hydrogen generation device 30 and releases stored hydrogen. The hydrogen storage device 40 is, for example, an alloy that occludes hydrogen, a high-pressure hydrogen tank, a liquid hydrogen storage device that converts hydrogen to decalin or the like and stores it in a liquid state. In this embodiment, the hydrogen storage device 40 is a high-pressure hydrogen tank. The hydrogen generation device 30, which includes measurement instruments (not illustrated) such as a pressure gage, sends information about the remaining amount of stored hydrogen to the control device 80.

Fuel Cell System

The fuel cell system 50 uses hydrogen released from the hydrogen storage device 40 to generate electric power under control of the control device 80. Generated electric power is supplied to the load 60 or electric power system 70. A known fuel cell system can be used as the fuel cell system 50.

Control Device

The control device 80, which only needs to have control functions, has an arithmetic processing unit (not illustrated) and a storage device that stores control programs. When the arithmetic processing unit reads out a control program stored in the storage device and executes the control program, the control device 80 performs predetermined control. The arithmetic processing unit is exemplified by a microcontroller a programmable logic controller (PLC), a microprocessor, a field-programmable gate array (FPGA), or the like. The storage device is exemplified by a memory. In this embodiment, the control device 80 is, for example, a microcontroller. The control device 80 may be a single control device that performs centralized control or may be formed from a plurality of control devices that perform distributed control in cooperation with one another.

The control device 80 controls electric power to be supplied from the natural energy power generation device 10 to the storage system 100 and electric power to be distributed from the storage system 100 to the load 60 based on, for example, information obtained from the natural energy power generation device 10, load 60, and electric power system 70 about electric power and to information obtained from the storage system 100 about an amount remaining in the power storage device 20 and an amount remaining in the hydrogen storage device 40.

Specifically, the control device 80 executes at least one of first control in which the control device 80 controls the ratio (first ratio) between electric power to be supplied from the natural energy power generation device 10 to the hydrogen generation device 30 and electric power to be supplied from the natural energy power generation device 10 to the power storage device 20 and second control in which the control device 80 controls the ratio (second ratio) between electric power to be supplied from the power storage device 20 to the load 60 and electric power to be supplied from the fuel cell system 50 to the load 60. Based on the ratios controlled in the first control and second control, the control device 80 performs control for electric power to be stored in the power storage device 20 and electric power to be released in the power storage device 20, the amount of hydrogen to be generated by the hydrogen generation device 30, electric power to be generated by the fuel cell system 50, and the like. The control device 80 may calculate the amount of hydrogen stored in the hydrogen storage device 40 as the amount of electric power stored in it, as necessary. In this case, the amount of electric power stored in the hydrogen storage device 40 may be the amount of electric power generated under the assumption that the fuel cell system 50 uses the total amount of hydrogen stored in the hydrogen storage device 40 to generate electric power.

Load

The load 60, which is, for example, a home electrical appliance in a house, consumes electric power based on the usage of the home electrical appliance. The load 60 is a device that receives electric power from at least one of the natural energy power generation device 10, storage system 100, and electric power system 70 and operates. Electric power supplied to the load 60 is measured by a measurement instrument (not illustrated) such as a wattmeter, and the measurement result is sent to the control device 80.

While electric power is not being supplied from the natural energy power generation device 10 or storage system 100 to the load 60, the electric power system 70 supplies electric power to the load 60. If the total of electric power generated by the natural energy power generation device 10 and electric power distributed from the storage system 100 is more than electric power consumed by the load 60, electric power is caused to flow back to the electric power system 70 by an amount equal to the difference between the total and the consumed electric power. Electric power received by the energy network 110 from the electric power system 70 and electric power caused to flow back from the energy network 110 to the electric power system 70 are measured by measurement instruments (not illustrated) such as a wattmeter, and measurement results are sent to the control device 80.

Detailed Description of the Control Device

Figure 2:
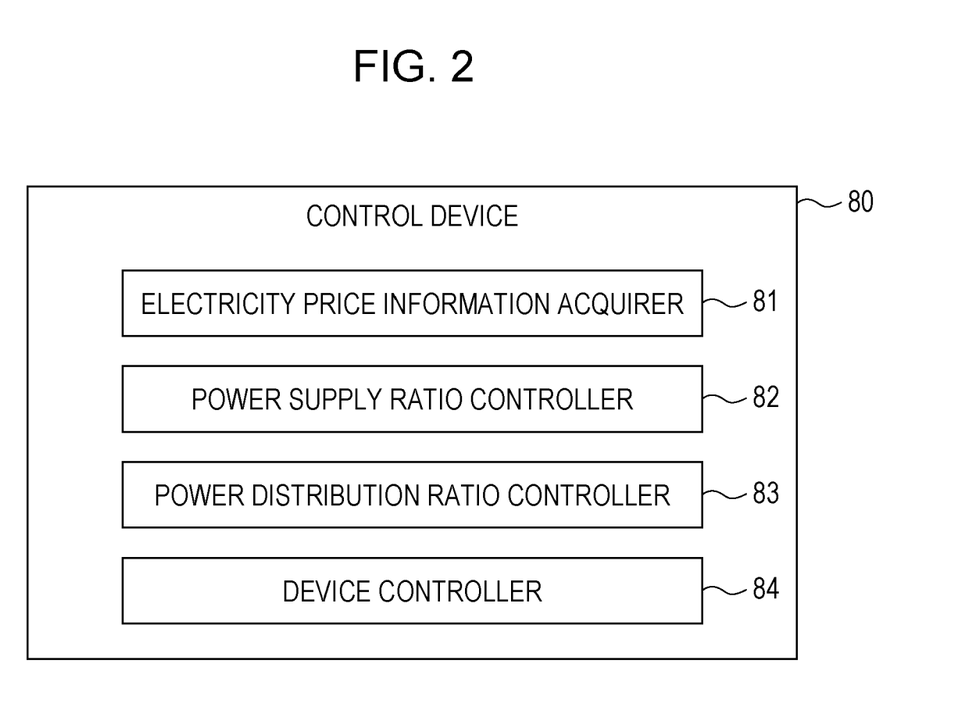
FIG. 2 illustrates an example of the structure of the control device in FIG. 1.

Next, the control device 80 will be described in detail. FIG. 2 illustrates an example of the structure of the control device 80.

The control device 80 includes an electricity price information acquirer 81, a power supply ratio controller 82, a power distribution ratio controller 83, and a device controller 84. These elements are functional blocks that are implemented when a processor included in the control device 80 reads out predetermined programs stored in a memory included in the control device 80 and executes the programs.

The electricity price information acquirer 81 acquires information about electric power that the energy network 110 receives from the electric power system 70 for a certain period and a unit electricity price determined based on electric power that flows back to the electric power system 70. To have the electricity price information acquirer 81 acquire the information about a unit electricity price, the user may enter the information by using an information input device (not illustrated) such as a keyboard or mouse to the control device 80. Alternatively, the control device 80 may acquire the information from a server possessed by the electric power company or a system operator through a communication network. The certain period is, for example, 24 hours from 0 o'clock to 24 o'clock. The electricity expense is calculated by multiplying the unit electricity price by (amount of purchased electric power−amount of sold electric power).

The electricity price information acquirer 81 acquires information, for example, about a unit electricity price that depends on the time period or the amount of electric power used, the unit electricity price being determined subject to the contract concluded between the user and the electric company or system operator that operates the electric power system 70 at the time of interconnection to the electric power system 70.

If the unit electricity price is constant regardless of the time period, the constant value is acquired. If the unit electricity price varies with time periods, information about the unit electricity price is acquired for each time period. If information about the unit electricity price varies with time, predicted information about the unit electricity price may be acquired besides information about the current unit electricity price.

When electric power is to be supplied from the natural energy power generation device 10 to the storage system 100, the power supply ratio controller 82 controls the ratio between electric power to be supplied to the power storage device 20 and electric power to be supplied to the hydrogen generation device 30 based on information acquired by the electricity price information acquirer 81 about the unit electricity price.

The power supply ratio controller 82 has a function that controls the ratio between electric power to be supplied to the power storage device 20 and electric power to be supplied to the hydrogen generation device 30 when electric power is supplied from the natural energy power generation device 10 to the storage system 100. The function controls the ratio so that, for example, the electricity expense is reduced, the electricity expense being determined based on electric power received from the electric power system 70 and electric power that flows back to the electric power system 70 in a time period from 0 o'clock to 24 o'clock.

When electric power is to be distributed from the storage system 100 to the load 60, the power distribution ratio controller 83 controls the ratio between electric power to be distributed from the power storage device 20 and electric power to be distributed from the 50 based on information acquired by the electricity price information acquirer 81 about the unit electricity price.

The power distribution ratio controller 83 has a function that controls the ratio between electric power to be distributed from the power storage device 20 and electric power to be distributed from the fuel cell system 50 when electric power is distributed from the storage system 100 to the load 60. The function controls the ratio so that, for example, the electricity expense is reduced, the electricity expense being determined based on electric power received from the electric power system 70 and electric power that flows back to the electric power system 70 in a time period from 0 o'clock to 24 o'clock.

The device controller 84 performs control for electric power to be stored in and electric power to be released from the power storage device 20, the amount of hydrogen to be generated from the hydrogen generation device 30, electric power to be generated from the fuel cell system 50, and the like, based on the power supply ratio controlled by the power supply ratio controller 82 and the power distribution ratio controlled by the power distribution ratio controller 83.

A target to be controlled is such that electric power to be supplied to the storage system 100 and electric power to be distributed from the storage system 100 can be controlled. For electric power to be stored in and electric power to be released from the power storage device 20, for example, the amount of electric power for a certain time or per unit time may be a target to be controlled. A value obtained by conversion to the amount of electric power may be used as the amount of hydrogen to be generated from the hydrogen generation device 30. In this case, the amount of electric power to be supplied (input) to the hydrogen generation device 30 to generate a controlled amount of hydrogen may be used as a converted value. Alternatively, the amount of electric power input to the hydrogen generation device 30 for a certain time or per unit time may be controlled. As for electric power generated by the fuel cell system 50, the amount of electric power for a certain time or per unit time may be controlled. A value for which electric power needed to operate a cooling water circulating pump and other devices included in the storage system 100 is taken into consideration may be controlled.

The control device 80 may be structured so that the device controller 84 is separated and the separated device controller 84 may be disposed at a position near the devices in the storage system 100. Specifically, the control device 80 may be composed of first and second control devices (not illustrated) that perform distribution control in cooperation with each other. The first control device may include the electricity price information acquirer 81, power supply ratio controller 82, and power distribution ratio controller 83, and the second control device may include the device controller 84.

Figure 3A:
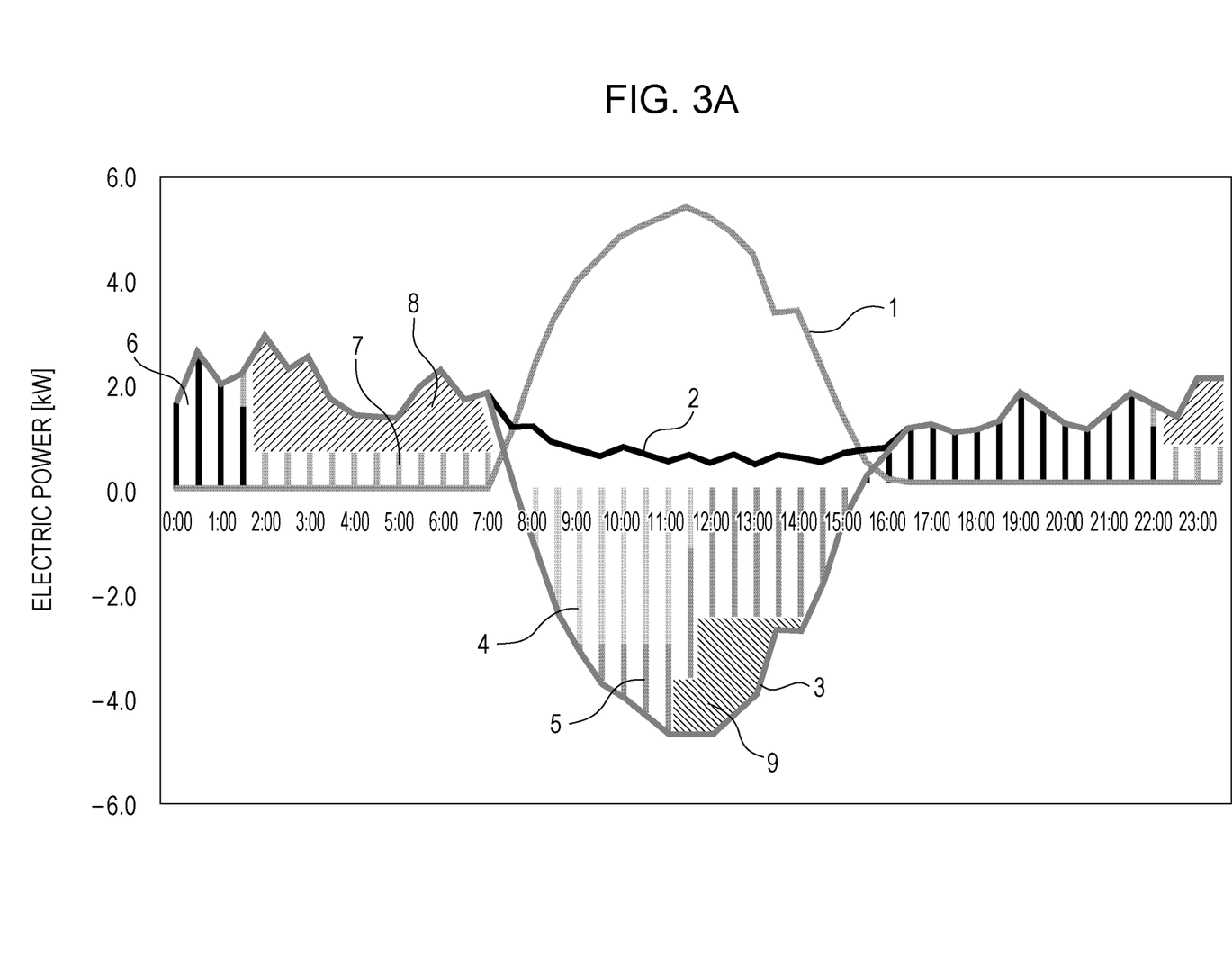
FIGS. 3A and 3B are each a graph illustrating electric power supplied to a storage system and electric power distributed from the storage system in one day.
Figure 3B:
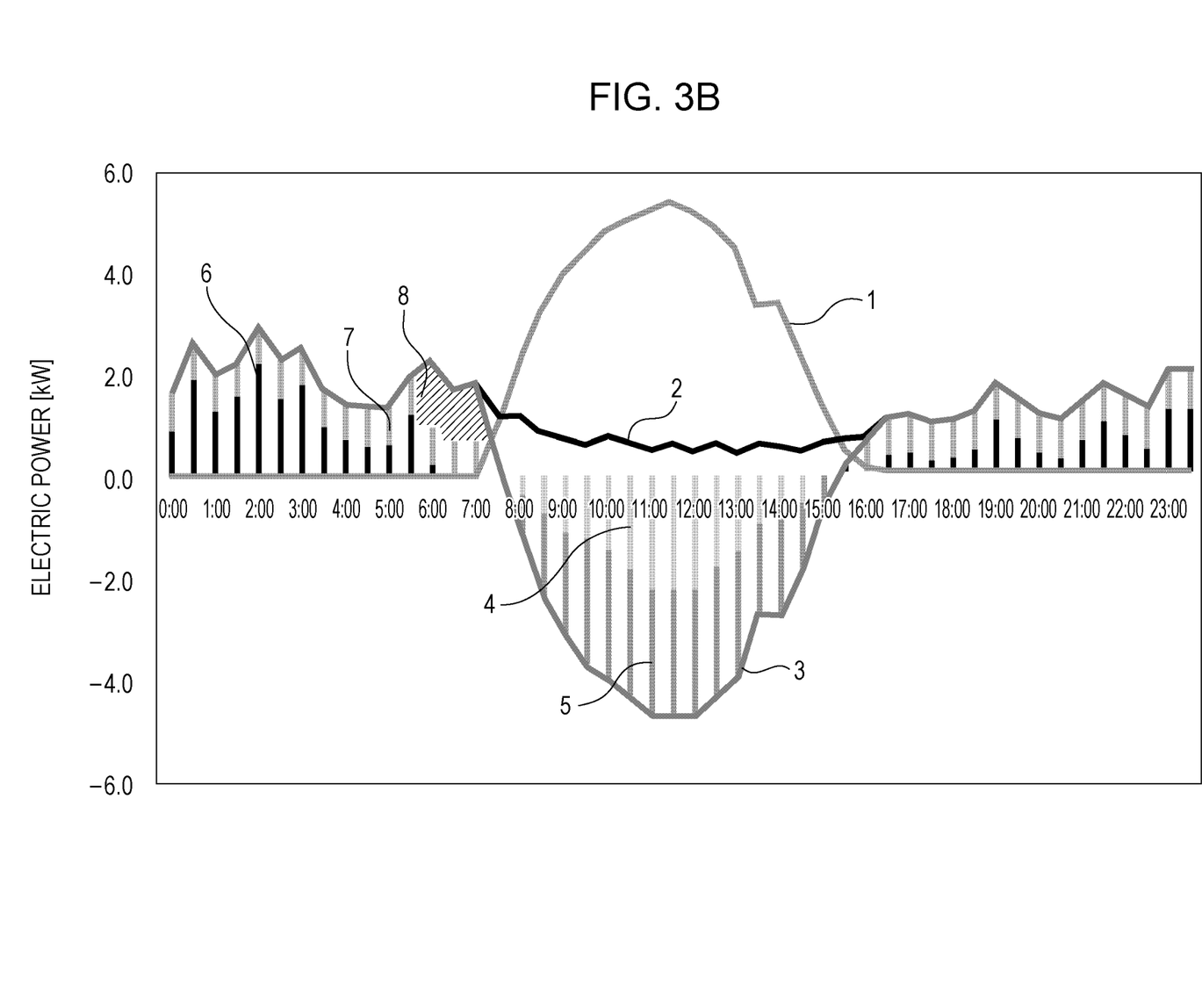

FIGS. 3A and 3B each illustrate an example of transitions of electric power supplied to and electric power distributed from the storage system 100 in one day for electric power generated by the natural energy power generation device 10 and electric power consumed by the load 60. The horizontal axis in FIGS. 3A and 3B represents time in one day.

The reference numeral 1 indicates generated electric power in the natural energy power generation device 10. The reference numeral 2 indicates demanded electric power, which is electric power consumed by the load 60. The reference numeral 3 indicates surplus electric power, which the difference between generated electric power 1 in the natural energy power generation device 10 and demanded electric power 2, which is electric power consumed by the load 60. The reference numeral 4 indicates stored electric power in the power storage device 20. The reference numeral 5 indicates input electric power to the hydrogen generation device 30. The reference numeral 6 indicates released electric power from the power storage device 20. The reference numeral 7 indicates generated electric power (output electric power) in the fuel cell system 50. The he reference numeral 8 indicates received electric power from the electric power system 70. The reference numeral 9 indicates flow-back electric power to the electric power system 70.

As illustrated in FIGS. 3A and 3B, generated electric power 1, which is indicated by a broken line, in the natural energy power generation device 10 takes values that rapidly change like a mountain in time periods from time 7:00 to a time between 16:00 and 17:00 and takes a value of essentially 0 in other time periods. Demanded electric power 2, indicated by a broken line, which is electric power consumed by the load 60, takes values that moderately change like a valley in time periods from time 7:00 to a time between 16:00 and 17:00, and also takes values that moderately change like a mountain in other time periods.

Surplus electric power 3, which is indicated by a broken line, is indicated in such a way that positive values are indicated as negative values and vice versa so that the ratio between electric power stored in the power storage device 20 and electric power stored in the hydrogen-type power storage device 90, the ratio between electric power released from the power storage device 20 and electric power released from the hydrogen-type power storage device 90, received electric power 8, and flow-back electric power 9 are easily understood. Surplus electric power 3 takes positives values (which are indicated as negative values in FIGS. 3A and 3B) that rapidly change like a mountain in time periods from a time between 7:00 and 8:00 and a time between 15:00 and 16:00, and also takes negative values (which are indicated as positive values in FIGS. 3A and 3B) that moderately change like a valley protruding in the negative direction in other time periods.

Stored electric power 4 in the power storage device 20, input electric power 5 to the hydrogen generation device 30, released electric power 6 from the power storage device 20, and generated electric power 7 in the fuel cell system 50 are indicated by four types of vertical bars having different levels of brightness. Stored electric power 4 in the power storage device 20 and input electric power 5 to the hydrogen generation device 30 are generated in time periods during which surplus electric power 3 takes a positive value. Stored electric power 4 in the power storage device 20 is indicated by vertical bars brighter than the vertical bars indicating input electric power 5 to the hydrogen generation device 30. Released electric power 6 from the power storage device 20 and generated electric power 7 in the fuel cell system 50 are generated in time periods during which surplus electric power 3 takes a negative value. Released electric power 6 from the power storage device 20 is indicated by vertical bars darker than the vertical bars indicating generated electric power 7 in the fuel cell system 50.

Received electric power 8 from the electric power system 70, which is indicated by a hatched area formed by lines inclined downward toward the left, is generated in time periods during which surplus electric power 3 takes a negative value. Flow-back electric power 9 to the electric power system 70, which is indicated by a hatched area formed by lines inclined downward toward the right, is generated in time periods during which surplus electric power 3 takes a positive value.

FIG. 3A illustrates a comparative example in which, when surplus electric power 3 takes a positive value, surplus electric power 3 is preferentially supplied to the power storage device 20. Specifically, if surplus electric power 3 is equal to or less than the upper limit of electric power storable in the power storage device 20, all of surplus electric power 3 is supplied to the power storage device 20. If surplus electric power 3 exceeds the upper limit of electric power storable in the power storage device 20, electric power is supplied to the power storage device 20 until the upper limit of storable electric power is reached and the remaining electric power is supplied to the hydrogen generation device 30. If the remaining electric power exceeds the upper limit of electric power receivable at the hydrogen generation device 30, the resulting surplus electric power is caused to flow back to the electric power system 70.

Also, in the comparative example, when surplus electric power 3 takes a negative value, electric power is preferentially supplied from the power storage device 20 to the load 60. Specifically, if demanded electric power 2 for the load 60 is equal to or less than the upper limit of electric power that can be released from the power storage device 20, all of demanded electric power 2 for the load 60 is supplied from the power storage device 20. If demanded electric power 2 for the load 60 exceeds the upper limit of electric power that can be released from the power storage device 20, electric power is supplied from the power storage device 20 as demanded electric power 2 for the load 60 until the upper limit of electric power that can be released is reached. Since electric power supplied from the power storage device 20 is insufficient for electric power demanded by the load 60, electric power generated by the fuel cell system 50 is supplied to compensate for the insufficiency. If the insufficiency exceeds the upper limit of electric power that can be generated in the fuel cell system 50, electric power is received from the electric power system 70 by an amount by which the upper limit is exceeded. If surplus electric power 3 described above takes a negative value, this means that power consumption (demanded electric power 2) of the load 60 is more than generated electric power 1 in the natural energy power generation device 10. In FIG. 3A, there are two time periods, 22:30 to 24:00 and 2:00 to 7:00, during which electric power is received (purchased) from the electric power system 70, separately. This is because there is a difference between transitions, illustrated in FIG. 3A, of electric power generated by the natural energy power generation device 10 and electric power consumed by the load 60 in one day and these transitions in the previous day. Since the remaining amount of electric power stored in the power storage device 20 in the day previous to the day indicated in FIG. 3A reached the lower limit until 2:00, electricity purchase occurred at 2:00 and later. Since the remaining amount of electric power stored in the power storage device 20 in the day indicated in FIG. 3A reached the lower limit until 22:30, electricity purchase occurred at 22:30 and later.

FIG. 3B illustrates an example in the present disclosure. Specifically, in FIG. 3B, when surplus electric power 3 takes a positive value, surplus electric power 3 is received by using both the power storage device 20 and hydrogen generation device 30 without preferentially using the power storage device 20. More specifically, if surplus electric power 3 is equal to or less than the upper limit of electric power storable in the power storage device 20, first power supply is executed in which the power supply ratio is controlled so that surplus electric power 3 is supplied to both the power storage device 20 and the hydrogen generation device 30. If surplus electric power 3 exceeds the upper limit of electric power storable in the power storage device 20, surplus electric power 3 is still supplied to both the power storage device 20 and the hydrogen generation device 30 but the ratio of electric power to be supplied to the power storage device 20 is lowered when compared with the comparative example. For example, second power supply is executed in which the power supply ratio is controlled so that electric power less than the upper limit of electric power storable in the power storage device 20 is supplied. If surplus electric power 3 exceeds the total of the upper limit of electric power storable in the power storage device 20 and the upper limit of electric power receivable at the hydrogen generation device 30, electric power is caused to flow back to the electric power system 70 by an amount by which the total is exceeded. It is appropriate that the first power supply and second power supply are executed before a time period during which surplus electric power 3 peaks (in this example, a time period from 11:00 to 12:30).

In the example in the present disclosure, when surplus electric power 3 takes a negative value, electric power is supplied to the load 60 by using both the power storage device 20 and fuel cell system 50 without preferentially using the power storage device 20. Specifically, if demanded electric power 2 for the load 60 is equal to or less than the upper limit of electric power that can be released from the power storage device 20, first power distribution is executed in which the power distribution ratio is controlled so that electric power is supplied (distributed) from both the power storage device 20 and the fuel cell system 50 as demanded electric power 2 for the load 60. If demanded electric power 2 for the load 60 exceeds the upper limit of electric power that can be released from the power storage device 20, electric power is still distributed from both the power storage device 20 and the fuel cell system 50 but the ratio of electric power to be distributed from the power storage device 20 is lowered when compared with the comparative example. For example, second power distribution is executed in which the power distribution ratio is controlled so that electric power less than the upper limit of electric power that can be released from the power storage device 20 is distributed from the power storage device 20 to the load 60. If demanded electric power 2 for the load 60 exceeds the total of the upper limit of electric power that can be released from the power storage device 20 and the upper limit of electric power that can be generated by the fuel cell system 50, electric power is received from the electric power system 70 by an amount by which the total is exceeded. It is appropriate that the first power distribution and second power distribution are executed before a time period during which demanded electric power 2 for the load 60 peaks (in this example, a time period from 19:00 to 19:30 and a time period from 2:00 to 2:30).

As seen from FIGS. 3A and 3B, if, for example, surplus electric power 3 takes a negative value, the power storage device 20 and fuel cell system 50 supply electric power to the load 60. At that time, the amount of electric power that can be supplied from the power storage device 20 and fuel cell system 50 to the load 60 for demanded electric power 2 for the load 60 is restricted by the capacities of the power storage device 20 and hydrogen storage device 40.

In the comparative example illustrated in FIG. 3A, the remaining amount of electric power stored in the power storage device 20 is exhausted before the natural energy power generation device 10 starts to generate electric power, after which only the fuel cell system 50 supplies electric power to the load 60. At that time, if demanded electric power 2 for the load 60 exceeds the upper limit of electric power that can be generated by the fuel cell system 50, electric power is received from the electric power system 70 by an amount by which electric power is insufficient. In this case, an electricity expense is involved based on electric power received and the unit price of purchased electric power.

In the example, illustrated in FIG. 3B, in the present disclosure, the ratio between the amount of electric power to be supplied from the power storage device 20 to the load 60 at night and the amount of electric power to be supplied from the fuel cell system 50 to the load 60 at night is controlled, so a time at which electric power remaining in the power storage device 20 is exhausted is delayed when compared with the comparative example in FIG. 3A. As a result, electric power received from the electric power system 70 is reduced. That is, the electricity expense is reduced, enabling an economic operation.

If surplus electric power 3 takes a positive value, surplus electric power 3 is supplied to the power storage device 20 and hydrogen generation device 30. The amount of electric power that can be supplied to the power storage device 20 and hydrogen generation device 30 at that time is restricted by the capacities of the power storage device 20 and hydrogen generation device 30.

In the comparative example illustrated in FIG. 3A, the remaining amount of electric power stored in the power storage device 20 reached the upper limit about noon, after which surplus electric power 3 is thereby supplied only to the hydrogen generation device 30. At that time, if surplus electric power 3 exceeds the upper limit of electric power that can be supplied to the hydrogen generation device 30, surplus electric power is caused to flow back to the electric power system 70, in which case surplus electric power is not stored in the storage system 100 as electric power, but is lost. In this case, an income due to electricity selling is gained based on electric power that flowed back and the unit price of sold electric power.

In the example, illustrated in FIG. 3B, in the present disclosure, the ratio between electric power to be supplied to the power storage device 20 and electric power to be supplied to the hydrogen generation device 30 is controlled starting from when surplus electric power 3 is generated from the natural energy power generation device 10, so a time at which electric power remaining in the power storage device 20 reaches the upper limit is delayed when compared with the comparative example in FIG. 3A. As a result, electric power that has been caused to flow back to the electric power system 70 is reduced and electric power is supplied to the hydrogen generation device 30 by an amount equal to the reduction.

In the present disclosure in FIG. 3B, in which electric power is supplied to the hydrogen generation device 30 without being sold, more electric power is supplied to the hydrogen generation device 30 and more hydrogen can thereby be generated than in the comparative example in FIG. 3A. Therefore, more electric power can be supplied from the fuel cell system 50 to the load 60 in a time period during which the natural energy power generation device 10 is not generating electric power, so the amount of electric power to be purchased (electricity purchase) can be reduced.

If, for example, the unit price of electric power to be sold is lower than the unit price of electric power to be purchased (electricity purchase), the electricity expense in the present disclosure in FIG. 3B is lower than in the comparative example in FIG. 3A. This means that an economic operation is being performed.

As described above, in the first embodiment, when surplus electric power 3 in the natural energy power generation device 10 is to be received, both the power storage device 20 and the hydrogen-type power storage device 90 are used to receive electric power under control of the control device 80 before free capacity for charging in the power storage device 20 is exhausted. Therefore, the possibility that a loss in surplus electric power 3 is caused by electricity selling can be lowered when compared with a case in which the power storage device 20 preferentially receives electric power. As a result, if surplus electric power 3 takes a negative value, as surplus electric power 3 stored in the storage system 100 is more used for the amount of electric power demanded by the load 60, the amount of electric power to be purchased is more reduced, lowering the electricity expense and thereby enabling an economic operation.

Also, in the first embodiment, if surplus electric power 3 takes a negative value, both the power storage device 20 and the fuel cell system 50 are used to distribute electric power to the load 60 under control of the control device 80 before the remaining amount of electric power stored in the power storage device 20 reaches the lower limit. Therefore, the possibility that the amount of electric power to be purchased is increased can be lowered when compared with a case in which the power storage device 20 is preferentially used to distribute electric power. As a result, if surplus electric power 3 takes a negative value, the electricity expense is lowered and an economic operation can be thereby performed.

Second Embodiment

Figure 4:
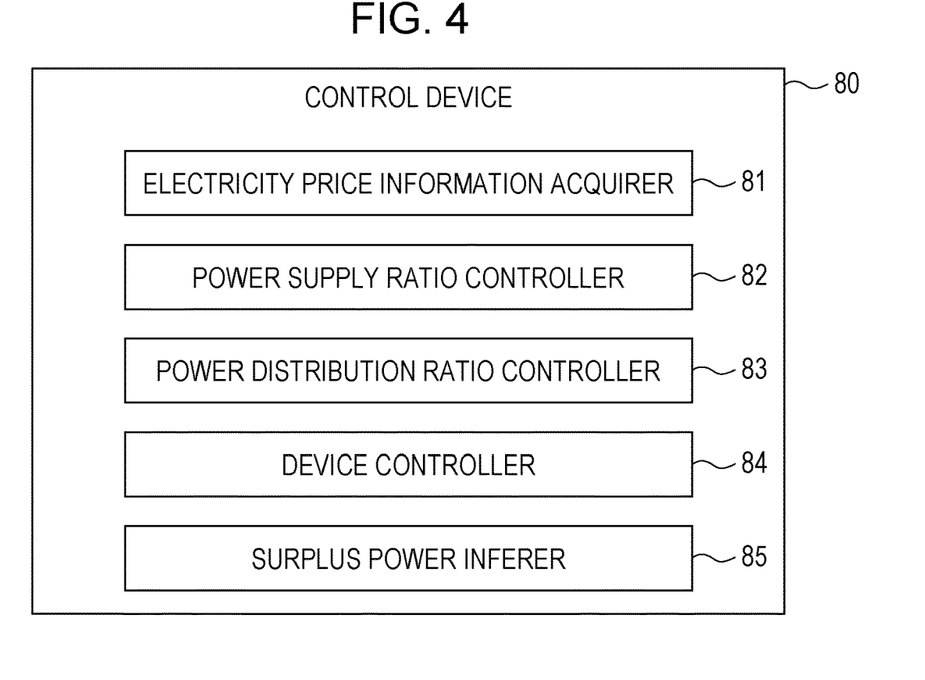
FIG. 4 illustrates an example of the structure of a control device in a power supply system according to a second embodiment of the present disclosure.

FIG. 4 illustrates an example of the structure of a control device 80 in a power supply system according to a second embodiment of the present disclosure. In FIG. 4, the same constituent elements as in FIG. 2 will be given the same reference numerals, and descriptions of these elements will be omitted.

In FIG. 4, the control device 80 includes an electricity price information acquirer 81, a power supply ratio controller 82, a power distribution ratio controller 83, a device controller 84, and a surplus power inferer 85.

The surplus power inferer 85 infers surplus electric power 3, which represents the difference in a certain period between electric power generated by the natural energy power generation device 10 and electric power consumed by the load 60. The certain period is, for example, 24 hours from 0 o'clock to 24 o'clock.

The surplus power inferer 85 infers surplus electric power 3 generated by the natural energy power generation device 10 in, for example, one day, and sends information about the inference to the power supply ratio controller 82.

The power supply ratio controller 82 controls the ratio between electric power to be supplied from the natural energy power generation device 10 to the power storage device 20 and electric power to be supplied from the natural energy power generation device 10 to the hydrogen generation device 30 based on information acquired from the electricity price information acquirer 81 about the unit electricity price and to information acquired from the surplus power inferer 85 about surplus electric power 3 so that the electricity expense is reduced. The power supply ratio controller 82 then supplies electric power at the controlled ratio.

Next, specific control will be described. If, for example, the power supply ratio controller 82 acquires, from the electricity price information acquirer 81, information indicating that the unit price of electric power sold to the electric power system 70 is lower than the unit price of electric power purchased from the electric power system 70 through a day, the power supply ratio controller 82 controls the power supply ratio so that more electric power in surplus electric power 3 in one day is supplied to the storage system 100.

Specifically, the power supply ratio controller 82 controls the power supply ratio so as to avoid a situation in which surplus electric power 3 cannot be stored in the power storage device 20 because the remaining amount of electric power stored in the power storage device 20 has reached the upper limit, based on the inferred information acquired from the surplus power inferer 85 about surplus electric power 3. If the inferred information acquired from the surplus power inferer 85 about surplus electric power 3 is changed, the power supply ratio controller 82 may control the power supply ratio again.

More specifically, in a time period during which surplus electric power 3 is less than the total of the upper limit of electric power that can be supplied to the power storage device 20 and the upper limit of electric power that can be supplied to the hydrogen generation device 30, the power supply ratio controller 82 controls the power supply ratio so as to supply part of surplus electric power 3 that can be supplied to the power storage device 20 to the hydrogen generation device 30. Thus, it is possible to change a time at which the remaining amount of electric power stored in the power storage device 20 reaches the upper limit.

A time at which the remaining amount of electric power stored in the power storage device 20 reaches the upper limit is preferably in, for example, a time period during which the value of surplus electric power 3 changes from positive to negative. The upper limit of the remaining amount of electric power stored in the power storage device 20 may be a predetermined value that is arbitrarily set by the user of the power storage device 20.

In contrast, if surplus electric power 3 is preferentially supplied to the power storage device 20, which is highly efficient, without the power supply ratio being controlled, the remaining amount of electric power stored in the power storage device 20 will reach the upper limit at an early stage, preventing surplus electric power 3 from being adequately supplied to the storage system 100. When surplus electric power 3 takes a negative value, therefore, electric power cannot be supplied from the storage system 100 to the load 60 by amount by which electric power could not be supplied to the storage system 100. This makes it necessary to purchase electric power from the electric power system 70. As a result, the electricity expense is increased.

This will be described by using a specific example. To simplify the description, the amount of electric power will be normalized. For example, it will be assumed that the amount electric power in solar power generation is 150 during the day, the amount of electric power that can be originally stored is 100 if the power supply ratio is controlled without electric power being preferentially supplied to the power storage device 20, the amount of electric power that could be actually stored is 70 because electric power was preferentially supplied to the power storage device 20, the amount of electric power consumed by the load 60 at night is 90, the amount of electric power, which is part of surplus electric power 3, that could not be supplied to the storage system 100 because the remaining amount of electric power stored in the power storage device 20 reached the upper limit is 30, and power generation/discharge efficiency is 0.9. Then, the amount of electric power to be originally purchased is 0 (90−100×0.9).

However, the amount of actually purchased electric power is 27 (90−70×0.9), so a purchase power price is involved in correspondence to the amount of electric power obtained by multiplying "the amount of electric power, which is part of surplus electric power 3, that could not be supplied to the storage system 100 because the remaining amount of electric power stored in the power storage device 20 reached the upper limit" described above by the efficiency.

Next, a period during which the power supply ratio controller 82 controls the power supply ratio will be described. The power supply ratio controller 82 controls the power supply ratio in a time period before surplus electric power 3 peaks so that larger free capacity by which the power storage device 20 can be charged remains after a time period during which electric power 3 peaks.

If, for example, the remaining amount of electric power stored in the power storage device 20 is near the upper limit in a time period during which surplus electric power 3 peaks, the remaining amount of electric power stored in the power storage device 20 will reach the upper limit after the time period during which surplus electric power 3 peaks. This prevents surplus electric power 3 from being supplied to the power storage device 20.

In view of this, the power supply ratio controller 82 acquires, from the surplus power inferer 85, a time period during which surplus electric power 3 will peak, controls the power supply ratio in a time period before surplus electric power 3 peaks, and supplies part of surplus electric power 3 that can be supplied to the power storage device 20 to the hydrogen generation device 30. As a result, larger free capacity by which the power storage device 20 can be charged remains after the time period during which surplus electric power 3 peaks, enabling more surplus electric power 3 to be supplied to the storage system 100.

The unit price of electric power to be sold when surplus electric power 3 is caused to flow back to the electric power system 70 may be greatly lower than the unit price of electric power to be purchased from the electric power system 70. In this case, surplus electric power 3 is supplied to the storage system 100 as much as possible and electric power is distributed from the storage system 100 to the load 60 as much as possible in a time period during which the natural energy power generation device 10 is not generating electric power. Accordingly, the electricity expense can be lowered. However, this is not true when the unit price of electric power to be sold is not lower than the unit price of electric power to be purchased. For example, there may be a case in which the unit price of electric power to be sold becomes higher than the unit price of electric power to be purchased during one day and the electricity expense can thereby be reduced by causing surplus electric power 3 to flow back to the electric power system 70. In this case, the control device 80 controls the storage system 100 so that surplus electric power 3 flows back to the electric power system 70.

In this control, the control device 80 decides whether to cause surplus electric power 3 to flow back or to store it in the storage system 100. The control device 80 infers electric power to be caused to flow back to the electric power system 70 and electric power to be purchased in one day in a case in which power supply is not controlled, based on inferred information acquired from the surplus power inferer 85 about surplus electric power 3. The control device 80 then infers an electricity expense in one day based on unit electricity price information acquired from the electricity price information acquirer 81.

Next, the method of determining a power supply ratio in a case in which power supply is controlled will be described. The power supply ratio controller 82 changes the power supply ratio at increments of, for example, 10% included in the range of 0% to 100% as a preset arbitrary power supply ratio and infers an electricity expense in one day. Specifically, if information inferred by the surplus power inferer 85 about surplus electric power 3 is, for example, the inferred amount of electric power during time periods from 0 o'clock to 24 o'clock, the inferred amounts of electric power to be supplied to the power storage device 20 and hydrogen generation device 30 can be obtained in each time period based on the power supply ratio preset for the power storage device 20 and hydrogen generation device 30. In this case, the above inferred amount of electric power to be supplied to the power storage device 20 or hydrogen generation device 30, the amount being inferred from the power supply ratio set in consideration of the amounts of electric power that can be supplied to the power storage device 20 and hydrogen generation device 30 in a unit time period, may exceed the amount of electric power that can be supplied to the power storage device 20 or hydrogen generation device 30. Then, the power supply ratio may be changed so that electric power is supplied to the other device for which the amount of electric power to be supplied to it is not exceeded by the exceeding amount, the other device being the power storage device 20 or hydrogen generation device 30, whichever is applicable. The amount of electric power that can be supplied to the power storage device 20 or hydrogen generation device 30 in a unit time period is an integrated value of the upper limit (rated value) of electric power that can be supplied per unit time (per second), the upper limit being set for the power storage device 20 or hydrogen generation device 30, in a unit time period (in this example, 30 minutes). In a time period during which the free capacity of the power storage device 20 or hydrogen storage device 40 is exhausted, however, the free capacity itself becomes the amount of electric power that can be supplied to the power storage device 20 or hydrogen storage device 40 per unit time period. The amount of electric power to be supplied to the power storage device 20, the amount being inferred in each time period, is added as the inferred amount of remaining electric power. Similarly, the amount of electric power to be supplied to the hydrogen generation device 30, the amount being inferred in each time period, is added as the inferred amount of stored hydrogen. The results of these additions are used in calculations in a next time period. At that time, energy losses caused during the supply of electric power to the power storage device 20 and hydrogen generation device 30 may also be considered.

Next, if the sum of the amount of electric power that can be supplied to the power storage device 20 and the amount of electric power that can be supplied to the hydrogen generation device 30 is exceeded in a time period, the amount of electric power by which the sum is exceeded is inferred as the amount (integrated value) of surplus electric power that is caused to flow back to the electric power system 70 in the time period.

When the above calculations are performed in each time period in one day, it is possible to infer the total amount of electric power to be caused to flow back to the electric power system 70 in one day and the total amount of electric power supplied to the power storage device 20 and hydrogen generation device 30 in one day, based on individual changed power supply ratios. In other words, it is possible to infer the amount of electric power to be sold, the amount of stored electric power, and the amount of stored hydrogen in one day based on power supply ratios.

Next, based on the amount of electric power to be sold, the amount of stored electric power, and the amount of stored hydrogen in one day, a combination of power supply ratios in individual time periods is selected so that the electricity expense is minimized. When surplus electric power 3 takes a negative value, the amount of electric power to be purchased can be reduced by supplying stored electric power. Therefore, the amount of stored electric power and the amount of stored hydrogen can be replaced with the amount of electric power by which electric power to be purchased per day is reduced, the amount being nearly equal to the amounts of electric power and hydrogen stored per day. Of course, the capacities of devices, energy losses, and power distribution ratios may be considered at the time of replacement.

To reduce the electricity expense in one day, therefore, it suffices to select a power supply ratio that makes the value of the expression below large by using the above replacement.

> (inferred amount of electric power by which electric power to be purchased per day is reduced)×(unit price of electric power to be purchased)+(inferred amount of electric power to be sold per day)×(unit price of electric power to be sold)

When a power supply ratio is selected based on the above procedure, the electricity expense can be reduced. Although, in this example, inference is performed at increments of 10% included in the range of 0% to 100%, inference may be performed a predetermined number of times in a predetermined range that is preset. A power supply ratio may be determined on the day before a day on which inference is to be performed. Alternatively, the power supply ratio may be updated by performing calculations again on that day.

To reduce the electricity expense, a decision is made from the inferred electricity expense as to whether to cause surplus electric power 3 to flow back or to control power supply to the storage system 100. In this decision, a value may be used for which energy conversion efficiency during power supply from the natural energy power generation device 10 to the storage system 100 and energy conversion efficiency during power distribution from the storage system 100 to the load 60 are considered.

Although, in this embodiment, the surplus power inferer 85 has been provided as an inference functional block that infers surplus electric power 3 in a certain period, this is not a limitation; any functional block can be used if it can infer surplus electric power 3 from weather information and previous information about surplus electric power 3.

Third Embodiment

Figure 5:
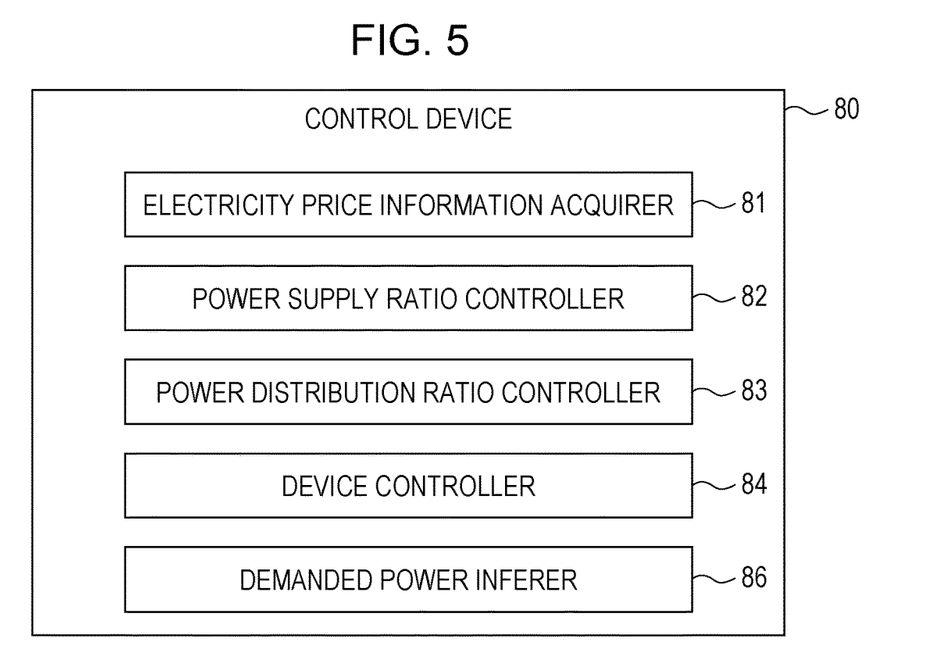
FIG. 5 illustrates an example of the structure of a control device in a power supply system according to a third embodiment of the present disclosure.

FIG. 5 illustrates an example of the structure of a control device 80 in a power supply system according to a third embodiment of the present disclosure. In FIG. 5, the same constituent elements as in FIGS. 2 and 4 will be given the same reference numerals, and descriptions of these elements will be omitted.

In FIG. 5, the control device 80 includes an electricity price information acquirer 81, a power supply ratio controller 82, a power distribution ratio controller 83, a device controller 84, and a demanded power inferer 86.

The demanded power inferer 86 infers demanded electric power 2 consumed by the load 60 in a certain period. The certain period is, for example, 24 hours from 0 o'clock to 24 o'clock. The demanded power inferer 86 infers demanded electric power 2 consumed by the load 60 in, for example, one day and outputs information about the inference to the power distribution ratio controller 83.

The power distribution ratio controller 83 controls the ratio between electric power to be supplied from the power storage device 20 to the load 60 and electric power to be supplied from the fuel cell system 50 to the load 60 based on information acquired from the electricity price information acquirer 81 about the unit electricity price and to information acquired from the demanded power inferer 86 about demanded electric power 2 so that the electricity expense is reduced. The power distribution ratio controller 83 then outputs the power distribution ratio.

Next, specific control will be described.

If, for example, the power distribution ratio controller 83 acquires, from the electricity price information acquirer 81, information indicating that the unit price of electric power to be purchased from the electric power system 70 is constant through a day, the power distribution ratio controller 83 controls the power distribution ratio so that electric power to be purchased in one day is reduced.

Specifically, the power distribution ratio controller 83 controls the power distribution ratio so as to avoid a situation in which electric power cannot be distributed from the power storage device 20 to the load 60 because the remaining amount of stored electric power has reached the lower limit, based on the inferred information acquired from the demanded power inferer 86 about the demanded electric power 2. If the inferred information acquired from the demanded power inferer 86 about the demanded electric power 2 is changed, the power distribution ratio controller 83 may control the power distribution ratio again.

More specifically, in a time period during which demanded electric power 2 is less than the total of the upper limit of electric power that can be released from the power storage device 20 and the upper limit of electric power that can be generated by the fuel cell system 50, the power distribution ratio controller 83 controls the power distribution ratio so as to supply part of demanded electric power 2 that can be supplied from the power storage device 20 from the fuel cell system 50. Thus, it is possible to change a time at which the remaining amount of electric power stored in the power storage device 20 reaches the lower limit.

An appropriate time at which the remaining amount of electric power stored in the power storage device 20 reaches the lower limit is in, for example, a time period during which the value of surplus electric power 3 changes from positive to negative. The lower limit of the remaining amount of electric power stored in the power storage device 20 may be a predetermined value that is arbitrarily set by the user of the power storage device 20.

Thus, electric power is purchased from the electric power system 70 as part of demanded electric power 2 only by an amount by which power distribution from the storage system 100 has not been possible because the remaining amount of electric power stored in the power storage device 20 has reached the lower limit. As a result, it is possible to suppress an increase in the electricity expense.

Next, a period during which the power distribution ratio controller 83 controls the power distribution ratio will be described. The power distribution ratio controller 83 controls the power distribution ratio in a time period before demanded electric power 2 peaks so that larger capacity (remaining amount of stored electric power) by which the power storage device 20 can be discharged remains after the time period during which demanded electric power 2 peaks.

If, for example, the remaining amount of electric power stored in the power storage device 20 is near the lower limit in a time period during which demanded electric power 2 peaks, the remaining amount of electric power stored in the power storage device 20 will reach the lower limit after the time period during which demanded electric power 2 peaks. This prevents electric power from being supplied from the power storage device 20 to the load 60.

In view of this, the power distribution ratio controller 83 acquires, from the demanded power inferer 86, a time period during which demanded electric power 2 peaks, controls the power distribution ratio in a time period before demanded electric power 2 peaks, and supplies, from the power storage device 20, part of demanded electric power 2 that can be released from the fuel cell system 50. As a result, larger capacity by which electric power can be released from the power storage device 20 remains after the time period during which demanded electric power 2 peaks, enabling more demanded electric power 2 to be distributed from the storage system 100.

Next, the method of determining a power distribution ratio will be described. The power distribution ratio controller 83 changes the power distribution ratio at increments of, for example, 10% included in the range of 0% to 100% as a preset arbitrary power distribution ratio and infers an electricity expense in one day. Specifically, if information inferred by the demanded power inferer 86 about demanded electric power 2 is, for example, the inferred amount of electric power for demanded electric power 2 during time periods from 0 o'clock to 24 o'clock, the inferred amounts of electric power to be supplied from the power storage device 20 and fuel cell system 50 to the load 60 can be obtained in each time period based on the preset power distribution ratio. In this case, the above inferred amount of electric power to be supplied, the amount being inferred from the power distribution ratio set in consideration of the amounts of electric power that can be supplied from the power storage device 20 and fuel cell system 50 to the load 60 in a unit time period, may exceed the permissible range of the power storage device 20 or fuel cell system 50. Then, the power distribution ratio may be changed so that electric power is distributed from the other device for which its permissible range is not exceeded by the exceeding amount, the other device being the power storage device 20 or fuel cell system 50, whichever is applicable. The amount of electric power that can be supplied from the power storage device 20 or fuel cell system 50 to the load 60 in a unit time period is an integrated value of the upper limit (rated value) of electric power that can be supplied per unit time (per second), the upper limit being set for the power storage device 20 or fuel cell system 50, in a unit time period (in this example, 30 minutes). In a time period during which the inferred amount of electric power remaining in the power storage device 20 or the inferred amount of hydrogen remaining in the hydrogen storage device 40 is exhausted, however, the inferred amount itself of remaining electric power or the amount itself of generated electric power that is calculated from the inferred amount of remaining hydrogen becomes the amount of electric power that can be supplied to the power storage device 20 or fuel cell system 50 per unit time period. The amount of electric power to be supplied from the power storage device 20, the amount being inferred in each time period, is subtracted as the inferred amount of remaining electric power. Similarly, the amount of electric power to be supplied from the fuel cell system 50, the amount being inferred in each time period, is subtracted as the inferred amount of stored hydrogen. The results of these subtractions are used in calculations in a next time period. At that time, energy losses caused during the supply of electric power may also be considered.

Next, if the sum of the amount of electric power that can be supplied from the power storage device 20 to the load 60 and the amount of electric power that can be supplied from the fuel cell system 50 to the load 60 is exceeded in a time period, the amount of electric power by which the sum is exceeded is inferred as the amount of electric power to be received (purchased) from the electric power system 70.

When the above calculations are performed in each time period in one day, it is possible to infer the total amount of electric power to be received from the electric power system 70 in one day based on individual changed power distribution ratios. In other words, it is possible to infer the amount of electric power to be purchased based on power distribution ratios in one day.

Next, to select the power distribution ratio at which the electricity expense is minimized based on the amount of electric power to be purchased per day, that is, to lower the electricity usage fee in one day, it suffices to select a power distribution ratio that makes the value of the expression below small.

(inferred amount of electric power to be purchased per day)×(unit price of electric power to be purchased)

When a power distribution ratio is selected based on the above procedure, the electricity expense can be reduced. Although, in this example, inference is performed at increments of 10% included in the range of 0% to 100%, inference may be performed a predetermined number of times in a predetermined range that is preset. A power distribution ratio may be determined on the day before a day on which inference is to be performed. Alternatively, the power distribution ratio may be updated by performing calculations again on that day.

Although, in this embodiment, the demanded power inferer 86 has been provided as an inference functional block that infers demanded electric power 2 in a certain period, this is not a limitation; any functional block can be used if it can infer demanded electric power 2 from weather information and previous information about demanded electric power 2.

Other Embodiments

In the power supply system in the second embodiment, the control device 80 may include the surplus power inferer 85 in the third embodiment and may control the power distribution ratio as in the third embodiment.

The power supply system in the present disclosure is useful as a power supply system that can supply electric power to a load so that the electricity expense can be reduced.

What is claimed is:

1. A power supply system connected to an electric power system, a natural energy power generation device, and a load, the system comprising:
    a hydrogen generation device that uses electric power to generate hydrogen;
    a hydrogen storage device that stores hydrogen generated by the hydrogen generation device;
    a fuel cell system that uses hydrogen stored in the hydrogen storage device to generate electric power;
    a power storage device; and
    a control device executing at least one of first control and second control based on an electricity expense, the first control controlling a first ratio between electric power to be supplied from the natural energy power generation device to the hydrogen generation device and electric power to be supplied from the natural energy power generation device to the power storage device, the second control controlling a second ratio between electric power to be supplied from the power storage device to the load and electric power to be supplied from the fuel cell system to the load.

2. The power supply system according to claim 1, wherein in the first control, the control device controls the first ratio so that the electricity expense is reduced.

3. The power supply system according to claim 1, wherein in the second control, the control device controls the second ratio so that the electricity expense is reduced.

4. The power supply system according to claim 1, wherein the control device executes the first control in a time period during which surplus electric power in the natural energy power generation device is less than a total of electric power that is capable of being stored in the power storage device and electric power that is capable of being received by the hydrogen generation device.

5. The power supply system according to claim 1, wherein the control device executes the first control before a time period during which surplus electric power in the natural energy power generation device peaks to control the first ratio so that free capacity by which the power storage device is capable of being charged remains after the time period during which surplus electric power peaks.

6. The power supply system according to claim 1, wherein the control device executes the second control in a time period during which electric power demanded by the load is less than a total of electric power that is capable of being released from the power storage device and electric power that is capable of being generated by the fuel cell system.

7. The power supply system according to claim 1, wherein the control device executes the second control before a time period during which surplus electric power in the natural energy power generation device peaks on a negative side to control the second ratio so that capacity by which the power storage device is capable of being discharged remains after a time period during which electric power demanded by the load peaks.

8. A method of controlling a power supply system connected to an electric power system, a natural energy power generation device, and a load, the method comprising:
   generating hydrogen in a hydrogen generation device by using surplus electric power in the natural energy power generation device;
   storing generated hydrogen in a hydrogen storage device;
   generating electric power in a fuel cell system by using hydrogen stored in the hydrogen storage device;
   charging a power storage device by using surplus electric power in the natural energy power generation device;
   discharging the power storage device; and
   executing at least one of first control and second control based on an electricity expense, the first control controlling a first ratio between electric power to be supplied from the natural energy power generation device to the hydrogen generation device and electric power to be supplied from the natural energy power generation device to the power storage device, the second control controlling a second ratio between electric power to be supplied from the power storage device to the load and electric power to be supplied from the fuel cell system to the load.

* * * * *